INVENTOR.
HARALD KROGSRUD
BY Eyre, Mann & Lucas
ATTORNEYS

INVENTOR.
HARALD KROGSRUD
BY Eyre, Mann & Lucas
ATTORNEYS

United States Patent Office 3,396,954
Patented Aug. 13, 1968

3,396,954
GAS-CURTAINED ELECTRIC SMELTING FURNACES AND METHOD OF COLLECTING REACTION GASES THEREOF
Harald Krogsrud, Gjettum, Norway, assignor to Elektrokemisk A/S, Oslo, Norway
Filed Mar. 11, 1966, Ser. No. 533,716
19 Claims. (Cl. 263—50)

ABSTRACT OF THE DISCLOSURE

An electric smelting furnace, having an open furnace pot, a roof spaced vertically above the opening of the pot, and overhead chutes leading to openings in the roof for feeding charge material into the pot and for withdrawing furnace reaction gases, is provided with at least one gas manifold constructed and arranged to generate a curtain of flowing gas in the outer periphery of the vertical space between the pot and the roof, when air or other gas is pumped into the manifold. The gas curtain seals that portion of the vertical space between the pot and the roof which it traverses, whereby penetration of such space by furnace reaction gases from one side or by the surrounding atmosphere from the opposite side is substantially prevented. The gas curtain thus acts as a window which allows visual observation of and direct mechanical access to the interior furnace operation and continuous feeding of charge and withdrawal of reaction gases, without interruption of the gas curtain or of the furnace operation.

---

Figure 1:
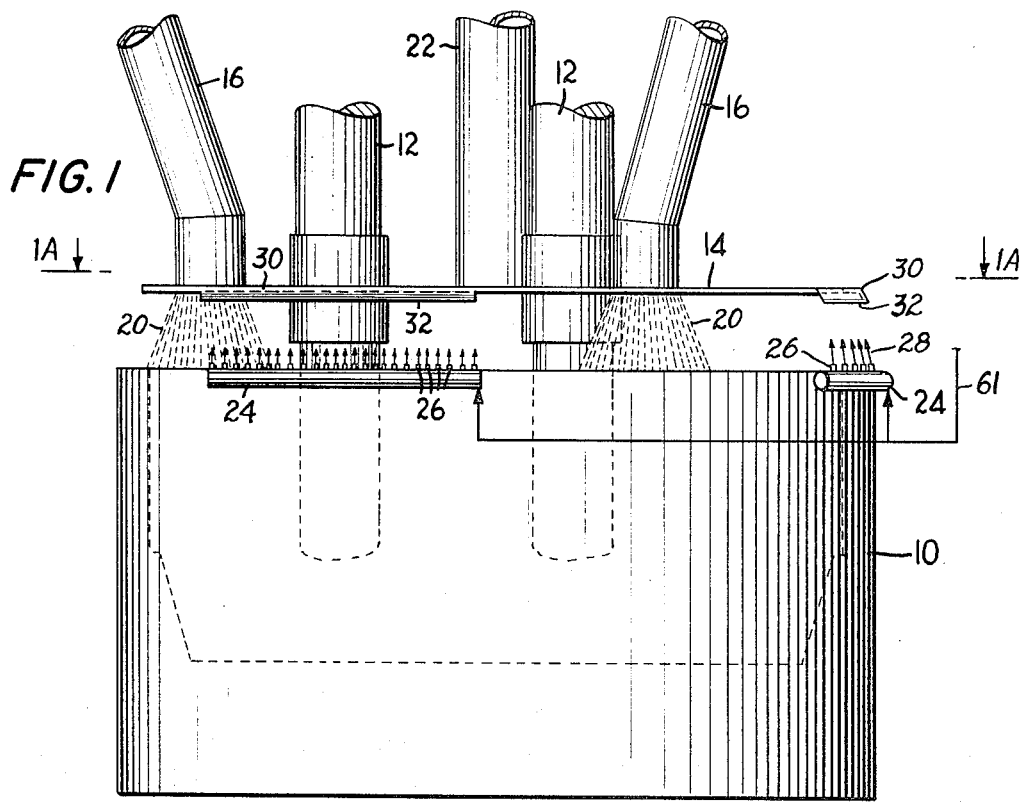

This invention relates to the collecting of gas in electric smelting furnaces used for production of pig iron, carbide, ferroalloys, etc. Such smelting furnaces may either be completely covered by means of a roof which covers substantially all of the cross-sectional area of the furnace pot, or they may be equipped with annular gas collecting chambers which surround each electrode separately in spaced relationship. The furnace reaction gases generated during operation of the furnace are then collected in these chambers in concentrated and uncombusted state. The annular chambers may also be connected by a common roof which is usually smaller than the entire furnace cross-section and which covers the central part of the furnace between the electrodes. A gas suction pipe is then arranged in this central roof and such furnaces are usually called semi-covered furnaces. The central roof may also be enlarged so that it encloses all the electrodes and covers almost all of the furnace cross-sectional area, and the annular chambers hanging from the room may be so suspended that their vertical position in relation to the charge level may be adjusted according to requirement, so that uncombusted gas as well as partly or completely combusted gas can be withdrawn from the furnace.

The semicovered furnaces, in their various forms and embodiments, have proved excellent for a series of smelting processes. However, in some smelting processes, for example in production of ferrosilicon, it is important to be able to stoke the charge from time to time, and there must therefore always be access to the charge for the stoking equipment. The above-described gas collecting chambers, and particularly the downwardly depending walls thereof, may easily be damaged by the stoking equipment, and the walls also prevent visual observation of the conditions in the furnace. Furthermore, the walls of the gas collecting chambers complicate the charging operation and addition of correcting material from the furnace floor. These are serious drawbacks which make the semicovered type of furnace less capable or desirable for production of for example high-grade ferrosilicon.

One attempt to obviate these problems has been to separate the depending walls of the gas collection chambers into sections which can be separately raised and even completely removed so that certain parts of the furnace may be left uncovered. In such furnaces, however, it is impossible to collect uncombusted gases in those periods in which stoking, charging and visual observation take place. As soon as one of the wall sections is raised or removed, the developed furnace gases will be ignited. As a result, visual observation as well as stoking, etc., will be more difficult; the furnace equipment may also be damaged by the heat action and the combustion value of the furnace gases is simultaneously lost.

A solution to the foregoing problems has now been discovered which makes it possible to collect concentrated and uncombusted furnace gases while simultaneously free openings for inspection, stoking and charging are maintained. In accordance with the invention, the depending walls of the gas collection chambers suspended from the furnace roof are completely or partially replaced by a stream of flowing gases which are injected in such a way that they constitute a partition wall or a curtain between those reaction gases which are produced in the furnace and the surrounding atmosphere. The gas curtain preferably consists of air, but the reaction gases which are produced in the smelting furnace themselves may also be circulated or recirculated and thus used to establish the curtain. Such reaction gases, which can be utilized in combusted or uncombusted state, may also be supplied from another smelting furnace or other equipment in which reaction gases are produced, for instance oil burners, calcining furnaces, etc. Water vapor or steam may also be utilized to form a gas curtain as described above.

The gases are injected under such velocity and pressure that the resulting gas curtain is an effective barrier which cannot be penetrated and traversed by either the furnace gases, located on one side of the curtain, or the surrounding atmosphere located on the other side. In this way, the depending solid walls of the conventional gas collection chambers are completely or partially eliminated, and the danger of damaging the chambers by stoking, etc., is removed. Since the furnace gases may be sucked off in concentrated and uncombusted state inside the perimeter of the gas curtain, the volume of the exhausted gases is considerably reduced, which results in simpler and cheaper gas cleaning plants. As is known, combustion of the furnace gases gives a gas volume which is 10 to 100 times the volume of the uncombusted furnace gas, and the capability of collecting highly concentrated uncombusted gas in furnaces modified in accordance with the invention is of great advantage in commercial operations. The particle size of the flue dust in uncombusted gases is also larger than that of combusted gases, and this results in simpler and more effective dust cleaning of the collected gases. The combustion value of the gases is also conserved and may be later used to generate heat in a manner which will contribute to cost reduction in commercial smelting operations. Finally, since the gas curtain is entirely transparent, visual observation of the smelting process is available at all times, and stoking and charging may be practiced through the gas curtain without any interruption in collection of the uncombusted furnace gases.

In carrying out the invention, the gas curtains may be injected, by means of gas manifolds, at any angle which suits the existing conditions. The gases may, for instance, be injected vertically or approximately vertically in upward as well as downward direction. The gas curtain may also be injected at any angle to the vertical line, and may also be horizontal and parallel to the furnace top. The gas curtain is preferably directed towards a knife-edged partition which divides the curtain in controlled manner so that any desired proportion thereof flows inwardly of the furnace roof while the rest escapes outside the roof and is removed through a stack or similar arrangement. These escaping gases may be recirculated to assist in maintaining the gas curtain. The speed and volume of the gases in the curtain may be adjusted according to requirements, but as previously noted should be high enough to prevent suction of outside air and penetration of fumes and flame tongues from the furnace through the gas curtain.

The gas injection for establishing the gas curtains is accomplished by means of gas manifolds which may for example be located along the edge of the furnace roof, and the gas is then blown downwards at any appropriate angle against the surface of the charge. The manifolds may also be arranged along the edge of the furnace pot or on the surface of the charge. The gas is then blown upwards, either vertically or at any appropriate angle, and the furnace may thus be enclosed along its extreme outer boundary or periphery. The knife-edged partitions may then be arranged along the periphery of the furnace cover. The gas manifolds may also be arranged vertically so that a horizontal gas curtain is obtained therefrom. The knife-edged partitions may then be arranged for example vertically in the middle of the open space to be covered by the gas curtains, or on the opposite side in relation to the manifolds. The gas manifolds and also the knife-edged partitions may in such case be suspended from the furnace roof or the charging chutes.

The area of the open spaces to be covered by the gas curtain may also be limited along vertical boundaries by the charging chutes or shafts which are normally used to feed charge to the furnace. In such case, the charging chutes or shafts are arranged at such a distance and spacing from the electrodes that the open spaces between the chutes or shafts can be bridged by gas curtains emanating from suitably positioned gas manifolds. The manifolds and the knife-edged partitions may for example be arranged on the shafts themselves. The open spaces will then be bounded vertically by the charging chutes and also be the charge heaps which flow out from the discharge openings of the shafts.

Figure 2A:
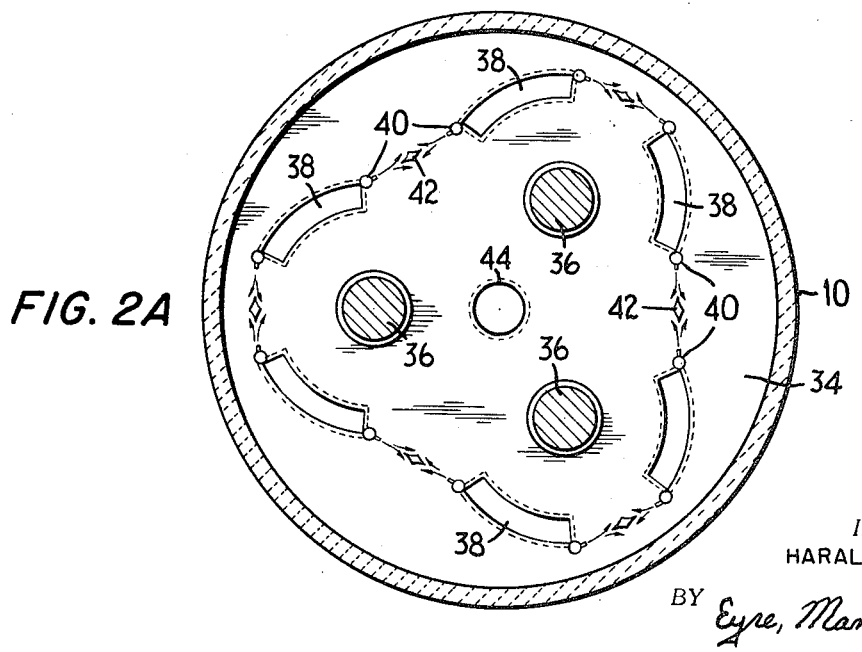
Figure 1A:
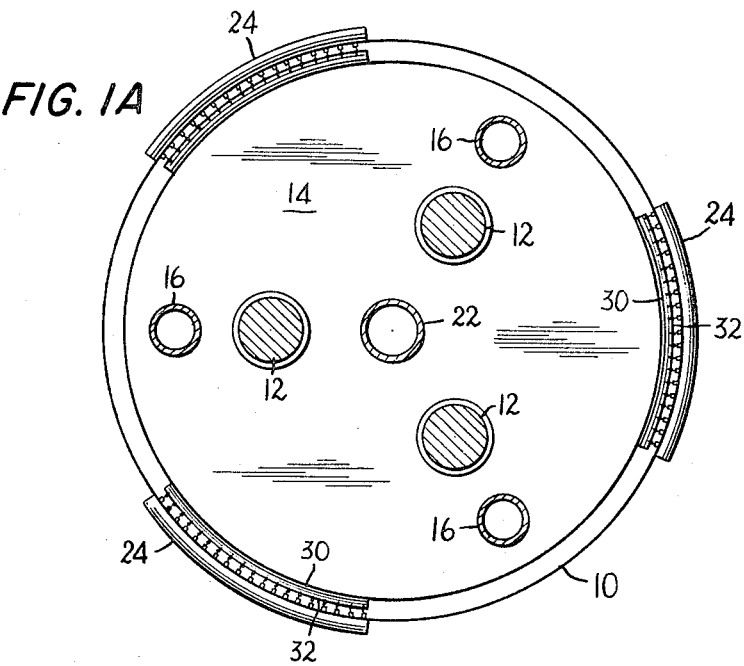
Figure 1B:
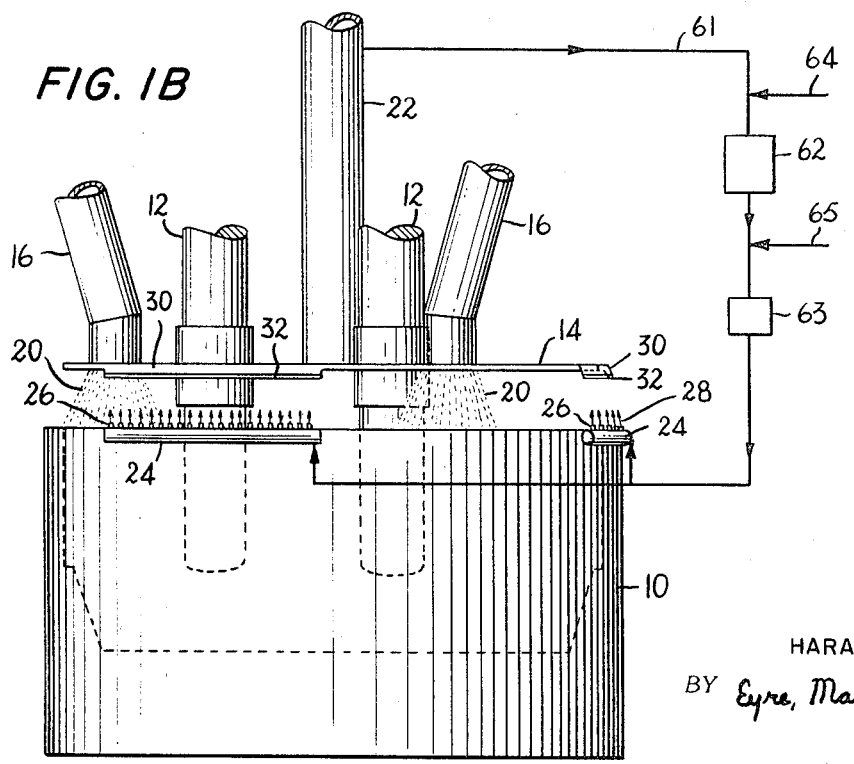
Figure 2:
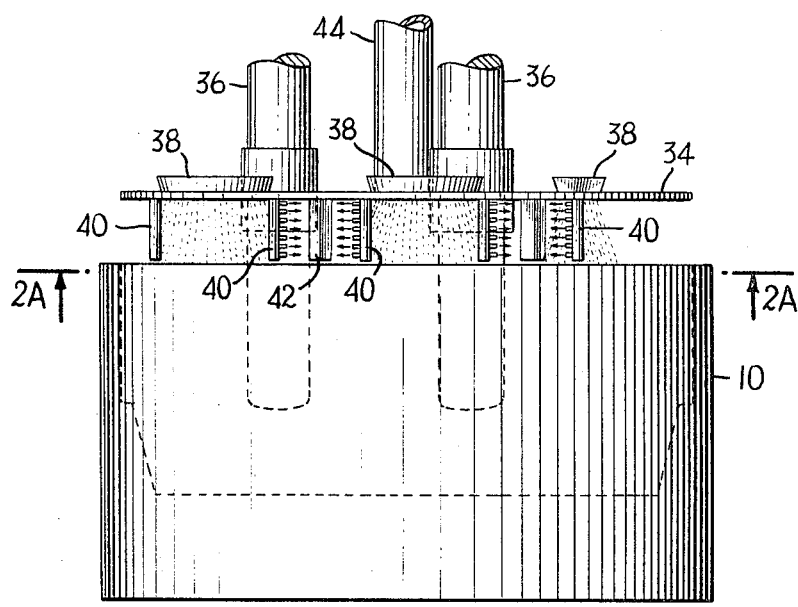
Figure 5A:
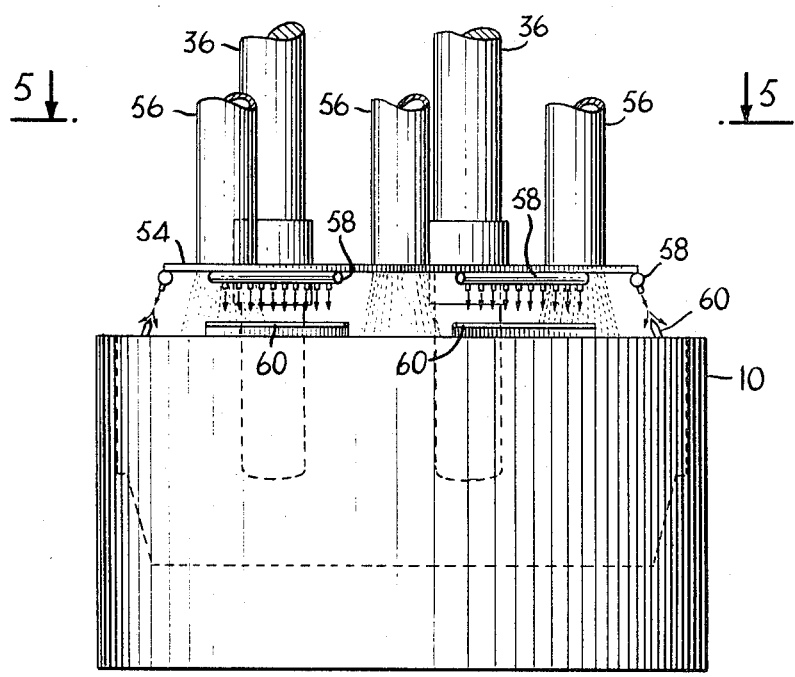
Figure 3:
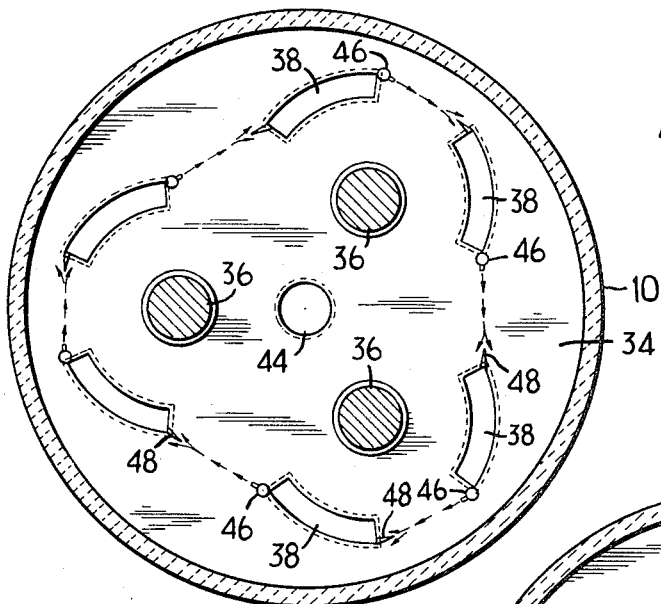
Figure 4:
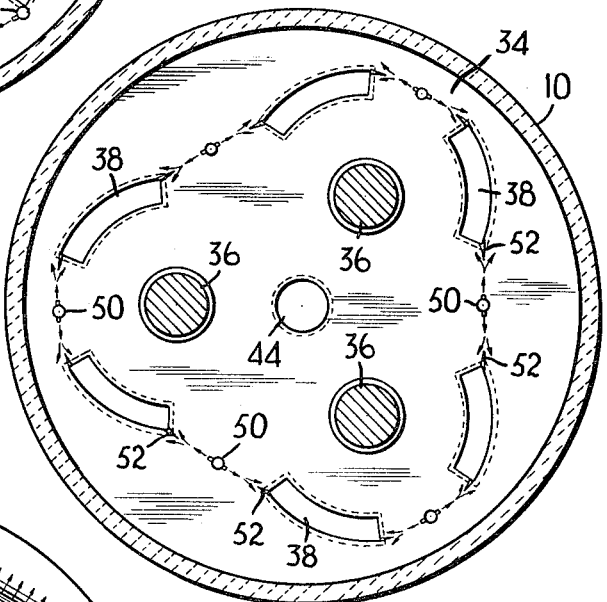
Figure 5:
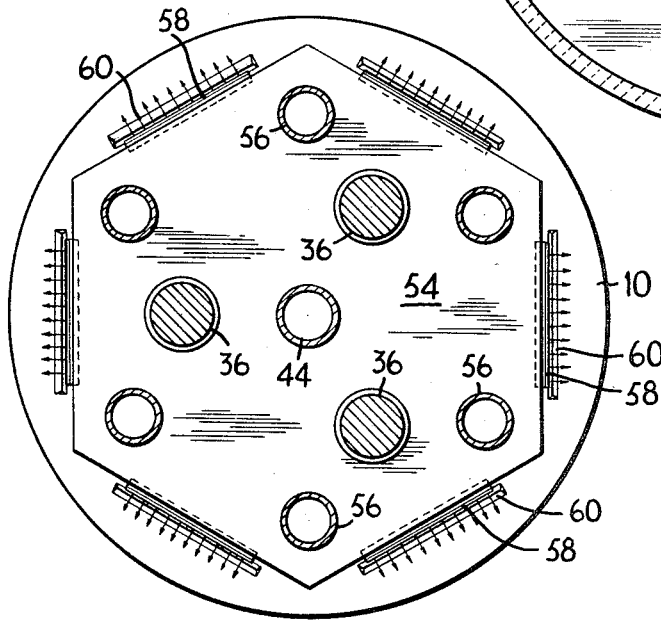

Further details of the invention will be readily understood by reference to the accompanying drawings which illustrate specific embodiments of the invention and of which:

FIG. 1 is a side view of a smelting furnace provided with means for closing open spaces thereof with gas curtains in accordance with the invention, FIG. 1A is a horizontal sectional view of the furnace of FIG. 1 taken along line 1A—1A, FIG. 1B is a side view similar to FIG. 1 and illustrates further details of gas circulation and recirculation systems used with the furnace of FIG. 1, FIG. 2 is a side view of a furnace equipped with a second embodiment of the invention, FIG. 2A is a horizontal sectional view of the furnace of FIG. 2 taken along line 2A—2A, FIG. 3 is a horizontal sectional view similar to FIG. 2A and illustrates a furnace equipped with a third embodiment of the invention, FIG. 4 is a horizontal sectional view similar to FIG. 2A and illustrates a furnace equipped with a fourth embodiment of the invention, FIG. 5 is a horizontal sectional view taken along line 5—5 of FIG. 5A and illustrates a furnace equipped with a fifth embodiment of the invention, and FIG. 5A is a side view of the furnace of FIG. 5.

Referring now to FIGS. 1 and 1A, a furnace is there shown which includes a furnace pot 10 and the electrodes 12. These electrodes 12 are suspended above and within the pot 10 and are supplied with electric current in conventional manner (not shown). The furnace includes a roof 14 which, as shown in the drawing, covers a substantial portion of the cross-sectional area of the pot 10. The shafts 16 extend from above down to the roof 14 and provide means for charging the furnace pot 10 with solid charge material to be smelted in the furnace. These shafts 16 are always filled with charge during normal furnace operation, and thus the charge forms heaps 20 beneath the discharge openings of the shafts as shown in the drawings. A central pipe 22 is included for withdrawing the furnace reaction gases which collect under the roof 14 during furnace operation.

In accordance with the invention, gas manifolds 24 are positioned along the peripheral edge of the furnace pot 10 at those locations where open space remains between the boundaries of the rim of the roof 14, the charge heaps 20 and the edge of the furnace pot 10. As shown in the drawings, the gas manifolds 24 are elongated pipes which are long enough to traverse the open spaces mentioned above and which are provided with small discharge openings 26 from which gas may issue forth. Of course, the manifolds 24 may be other than circular in shape and may be provided with a narrow continuous slit rather than separate openings such as 26 for discharge of gas.

As shown by the arrow 28, the discharge therefrom is directed toward the inclined rim 30 of the roof 14. Also, the rim 30 is preferably provided with a knife-edged partition 32 which is oriented in the same plane as that of the gas flow (28) whereby the partition 32 may divide said flow. The gas manifolds 24 are supplied with gas under pressure by means of conventional pipes and blowers. One example of a gas supply system for the manifolds 24 is illustrated in FIG. 1B. In this system, gases withdrawn by pipe 22 are conveyed through pipe 61 to a gas cleaning apparatus 62 and, if desired, impure reaction gases withdrawn from another furnace (not shown) may be merged through pipe 64 with the gases of pipe 61 so that the total combined gas flow may be cleaned in apparatus 62. The cleaned gases leaving apparatus 62 pass through blower 63 which pumps the cleaned gases into the manifolds 24. Again, if desired, cleaned gases from another source (not shown) may be merged through pipe 65 with the gases cleaned in apparatus 62 at a junction prior to blower 63.

During operation of the furnace, gas is continuously blown into the gas manifolds 24 and out therefrom through the discharge openings 26. The velocity and volume of this continuous gas flow is controlled to make the resulting gas curtain effective as a barrier which cannot be traversed by the furnace reaction gases or by the surrounding atmosphere. The gas curtain extends from the discharge openings 26 up to the partitions 32, where the curtain is divided so that a minor proportion of the gas flow enters the roofed interior of the furnace pot 10 and the remainder passes by the exterior of the roof 14 and rim 30. This exterior gas flow can if desired be removed by a hood and suction fans.

By the foregoing process, the open spaces between the roof 14, the charge heaps 20 and the edge of the furnace pot 10 are covered by a transparent gas curtain which prevents escape of the furnace reaction gases into the surrounding atmosphere and, conversely, prevents the surrounding atmosphere from entering into the enclosed furnace interior. Thus, the furnace reaction gases can be withdrawn through pipe 22 without any combustion thereof so that the full heat value of the gases is conserved for later advantageous use. At the same time, the smelting process within the furnace can be observed at all times, and stoking and similar mechanical operations can be readily carried out without interrupting or disturbing the furnace operation.

FIGS. 2 and 2A illustrate a second embodiment of the invention wherein a furnace roof 34 is equipped with electrodes 36 and charge shafts 38 which perform the functions of the corresponding parts described in connection with FIG. 1. However, in the embodiment of FIG. 2, gas manifolds 40 are suspended vertically to extend from the roof 34 down to the level of the furnace pot 10. These vertical gas manifolds 40 may be supported either by attachment to the roof 34 or to the charge chutes 38, and knife-edged partitions 42 are aligned between each pair of gas manifolds 40 which face each other from their positions at opposite edges of the charge chutes 38. Finally, a central pipe 44 is included for gas withdrawal as in the case of FIG. 1.

During operation of the FIG. 2 embodiment of the invention, gas is pumped into the gas manifolds 40 which are provided with discharge openings which, as shown by the arrows, cause two gas curtains to converge from each facing pair of manifolds at opposite edges of the charge chutes 38 towards the knife-edged partitions 42. The converging gas curtains are divided by the partitions 42 whereby some of the gas flow enters into the roofed interior of the furnace and the remainder passes outwardly away from the furnace interior. Thus, in this embodiment, the gas curtains are generated by horizontal gas flow instead of the inclined vertically oriented gas flow shown in FIG. 1. Also, in the embodiment of FIG. 2, a greater proportion of the furnace pot cross-section is left uncovered. However, this is not of disadvantage since the outer boundaries of the furnace contain relatively cold charge and only small volumes of furnace reaction gases are generated at the outer charge areas. Accordingly, the greatest proportion of the furnace reaction gases are enclosed within the generally circular perimeter defined by the outer walls of the charge chutes 38 and the intervening gas curtains formed by the manifolds 40 with the aid of the knife-edged partitions 42.

FIG. 3 illustrates a third embodiment of the invention which is substantially similar to the embodiment illustrated in FIGS. 2 and 2A. However, in FIG. 3 a single gas manifold 46 is employed at one of the two facing edges of each pair of charge chutes 38. At the opposite facing edge of the second charge chute in each pair, a knife-edged partition 48 is aligned to face the discharge openings of the manifolds 46. Thus, in operation of the FIG. 3 embodiment of the invention, the horizontal gas flow from each manifold 46 traverses the open spaces extending to the knife-edged partitions 48 where the gas flow is again divided so that some of it enters the roofed interior of the furnace and the remainder passes outwardly away from the furnace interior. Again, the open spaces between the charge chutes 38 are thus covered by gas curtains which cannot be traversed by the furnace reaction gases enclosed therein or by the surrounding atmosphere.

FIG. 4 illustrates a fourth embodiment of the invention which again is somewhat similar to the embodiment of FIGS. 2 and 2A. However, in FIG. 4 gas manifolds 50 are suspended from the furnace roof 34 at locations which are equidistant between two opposite facing edges of each pair of charge chutes 38. Such opposite facing edges of the charge chutes 38 are equipped with knife-edged partitions 52 which are arranged to intercept and divide the gas curtains emanating from the manifolds. The gas manifolds 50 are provided with two opposite sets of discharge openings with each set directing a gas curtain towards each aligned knife-edged partition 52. Thus, during furnace operation, gas is blown into the manifolds 50 from whence it issues forth as two separate curtains each one blowing against each of the facing knife-edged partitions 52 in each pair of opposite charge chutes 38 as illustrated by the arrows. In this way the spaces between each pair of opposite charge chutes 38 is covered by two gas curtains which are divided by the knife-edged partitions 52 whereby a portion of the gas flow enters the roofed interior of the furnace and the remainder passes outwardly toward the edge of the furnace pot 10. As with the previous embodiments, the furnace reaction gases are effectively enclosed within the substantially circular perimeter defined by the outer walls of the charge chutes 38, and the intervening gas curtains formed by means of the gas manifolds 50 with the aid of the knife-edged partitions 52.

Referring now to FIGS. 5 and 5A, a fifth embodiment of the invention is illustrated there which includes the furnace pot 10 along with a hexagonal roof 54 which is equipped with the electrodes 36 and the gas withdrawal pipe 44 as in the embodiments of FIGS. 2, 3 and 4. Charge chutes 56 are positioned near the apices of the hexagonal roof 54 for discharging charge material beneath the roof 54 and the heaps of charge material formed under the discharge openings of the shafts 56 provide a gas seal for some distance extending away from both sides of each apex.

In accordance with the invention, the intervening open spaces between such charge heaps are sealed by gas curtains which are injected from gas manifolds 58 positioned along the edge of each straight side of the hexagonal roof 54, these manifolds being long enough to traverse the open space left between the heaps of charge built up below the discharge openings of the shafts 56. Beneath the gas manifolds 58, either on the charge material or on the edge of the furnace pot 10, are aligned knife-edged partitions 60 with the knife edges thereof facing upwardly. The gas manifolds 58 are provided with discharge openings which face downwardly in alignment with the knife edges of the partitions 60.

During operation of the FIG. 5 embodiment of the invention, gas is blown into the gas manifolds 58 from whence the gas emanates and flows downwardly to the knife-edged partitions 60. This forms a gas curtain across each open space between the charge chutes 56, a portion of such gas curtain being directed inwardly towards the roofed furnace interior by the knife-edged partitions 60 and the remainder passing outwardly away from the furnace interior. Again, the furnace reaction gases are thereby completely enclosed within the perimeter of the generally circular wall defined by the charge heaps and the intervening gas curtains. Of course, the upper and lower boundaries of this enclosure are defined respectively by the roof 54 and by the upper surface of the furnace pot 10 along with the upper surface of charge material resting therein.

The invention has now been described in terms of its general principles of operation as well as by specific embodiments thereof. Further obvious changes in the details of operation will be obvious to those skilled in the art. For example, as previously mentioned the entire perimeter of the furnace pot or of the furnace roof can be provided with a gas manifold whereby the furnace reaction gases will be contained within a vertical enclosure defined entirely by a continuous gas curtain emanating from such gas manifolds.

Accordingly, it will be understood that it is intended to cover all changes and modifications of the preferred embodiments of the invention, herein chosen for the purpose of illustration, which do not depart from the spirit and scope of the invention.

What is claimed is:

1. In an electric furnace having a roof vertically spaced above a furnace pot with said pot having an open mouth beneath said roof, the improvement which comprises gas manifold means for directing a curtain of flowing gases along at least a portion of the outer periphery of the open space between said roof and said furnace pot, means for feeding flowing gases into said gas manifold means with sufficient velocity and volume to establish said curtain as an effective barrier which cannot be traversed by furnace reaction gases or by the surrounding atmosphere, and means for feeding charge material into said furnace pot without interrupting said curtain.

2. A furnace as in claim 1 which includes at least one knife-edged partition positioned to intercept said gas curtain, said partition dividing said gas curtain and causing a proportion thereof to flow inwardly toward the interior of said furnace and the remaining portion to flow outwardly away from said furnace interior.

3. A furnace as in claim 1 wherein said gas manifold means are positioned to direct said curtain upwardly from the furnace pot to the furnace roof.

4. A furnace as in claim 1 wherein said gas manifold means are positioned to direct said gas curtain downwardly from said furnace roof to said furnace pot.

5. A furnace as in claim 1 wherein said gas manifold means are positioned to direct said gas curtain horizontally.

6. A furnace as in claim 1 wherein said gas manifold means constitute three elongated cylindrical pipes having discharge openings, said pipes being spaced apart and positioned along the outer edge of said furnace pot, and said discharge openings being oriented to direct three curtains of flowing gases upwardly from said furnace pot to said furnace roof.

7. A furnace as in claim 6 wherein said gas curtains are directed upwardly at an angle inclined away from the vertical.

8. A furnace as in claim 1 wherein said gas manifold means constitutes three elongated chambers having discharge openings, said chambers being spaced apart and positioned along the rim of said furnace roof, and said discharge openings being oriented to direct three curtains of gas flow downwardly toward said furnace pot.

9. A furnace as in claim 1 wherein said gas manifold means constitutes elongated cylindrical pipes having discharge openings and being suspended vertically in spaced positions from the furnace roof, said discharge openings being oriented to direct a plurality of curtains of gas flow horizontally.

10. A furnace as in claim 9 which includes a plurality of knife-edged partitions suspended vertically from said furnace roof, said partitions being positioned to intercept and divide the plurality of gas curtains to cause a portion of the gas flow of said curtains to flow inwardly toward the interior of said furnace pot and the remaining portion to flow outwardly away from said furnace interior.

11. A method of collecting reaction gases generated in electric smelting furnaces having a roof vertically spaced above a furnace pot with said pot having an open mouth beneath said roof, which comprises directing a curtain of flowing gases along at least a portion of the outer periphery of the open space between said roof and said furnace pot, controlling the velocity and volume of the flowing gases to establish said curtain as an effective barrier which cannot be traversed by the furnace reaction gases or by the surrounding atmosphere, and withdrawing furnace reaction gases from within the furnace interior enclosed at least in part by said gas curtain.

12. A method as in claim 11 wherein said gas curtain is directed upwardly from said furnace pot to said furnace roof.

13. A method as in claim 11 wherein said gas curtain is directed downwardly from said furnace roof to said furnace pot.

14. A method as in claim 11 wherein said gas curtain is directed horizontally along the outer periphery of the open space between said furnace pot and said furnace roof.

15. A method as in claim 11 which includes the added steps of feeding charge material to said furnace pot through a plurality of spaced openings positioned near the rim of said furnace roof and thereby building up heaps of charge below said openings which fill spaced areas of the open space between said furnace pot and said furnace roof, and directing the gas curtains across the remaining outer periphery of the open spaces between said spaced heaps of charge to form a complete barrier around the outer periphery of the open space between said furnace roof and furnace pot composed successively of the spaced heaps of charge and the gas curtains.

16. A method as in claim 11 which includes the step of dividing said gas curtains so that a portion of the gas flow thereof is directed inwardly toward the interior of said furnace and the remaining portion is directed outwardly away from said furnace interior.

17. A method as in claim 11 wherein the gas used to establish said gas curtain is air, steam or furnace reaction gases.

18. A method as in claim 17 wherein said furnace reaction gases are generated in the same furnace as the furnace provided with said gas curtain.

19. A method as in claim 17 wherein said furnace reaction gases are generated in a furnace different than the furnace provided with said gas curtain.

References Cited

UNITED STATES PATENTS

| | | | |
|---|---|---|---|
| 549,235 | 11/1895 | Gatcke | 263—50 |
| 1,808,721 | 6/1931 | Hayes | 263—50 |
| 2,954,968 | 10/1960 | Vedder | 263—50 |
| 3,172,349 | 3/1965 | Courtier | 98—36 |
| 3,213,178 | 10/1965 | Sem | 13—9 XR |

FREDERICK L. MATTESON, JR., *Primary Examiner.*

A. D. HERRMANN, *Assistant Examiner.*